United States Patent
Rashkovskiy

(10) Patent No.: US 7,281,220 B1
(45) Date of Patent: Oct. 9, 2007

(54) STREAMING VIDEO PROGRAMMING GUIDE SYSTEM SELECTING VIDEO FILES FROM MULTIPLE WEB SITES AND AUTOMATICALLY GENERATING SELECTABLE THUMBNAIL FRAMES AND SELECTABLE KEYWORD ICONS

(75) Inventor: Oleg B. Rashkovskiy, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 09/583,703

(22) Filed: May 31, 2000

(51) Int. Cl.
*G06F 3/048* (2006.01)

(52) U.S. Cl. ...................... 715/838; 709/219

(58) Field of Classification Search ............... 709/219, 709/217, 224, 205, 231; 345/717; 705/14; 382/176; 707/10, 3, 4, 104.1, 1, 9; 386/95, 386/96; 725/137; 945/717; 715/838
See application file for complete search history.

(56) References Cited

U.S. PATENT DOCUMENTS

| | | | | |
|---|---|---|---|---|
| 5,644,714 A | * | 7/1997 | Kikinis | 702/219 |
| 5,740,549 A | * | 4/1998 | Reilly et al. | 705/14 |
| 5,778,367 A | * | 7/1998 | Wesinger et al. | 707/10 |
| 5,778,382 A | * | 7/1998 | Hatori | 707/1 |
| 5,802,518 A | * | 9/1998 | Karaev et al. | 707/9 |
| 5,835,667 A | * | 11/1998 | Wactlar et al. | 386/96 |
| 5,859,662 A | * | 1/1999 | Cragun et al. | 725/137 |
| 5,864,871 A | * | 1/1999 | Kitain et al. | 707/104.1 |
| 5,870,559 A | * | 2/1999 | Leshem et al. | 709/224 |
| 5,870,754 A | * | 2/1999 | Dimitrova et al. | 707/104.1 |
| 5,905,981 A | * | 5/1999 | Lawler | 707/4 |
| 6,104,861 A | * | 8/2000 | Tsukagoshi | 386/95 |
| 6,115,035 A | * | 9/2000 | Compton et al. | 345/717 |
| 6,269,394 B1 | * | 7/2001 | Kenner et al. | 709/217 |
| 6,282,567 B1 | * | 8/2001 | Finch et al. | 709/219 |
| 6,463,426 B1 | * | 10/2002 | Lipson et al. | 707/3 |
| 6,510,432 B1 | * | 1/2003 | Doyle | 707/10 |
| 6,581,103 B1 | * | 6/2003 | Dengler | 709/231 |
| 6,608,930 B1 | * | 8/2003 | Agnihotri et al. | 382/176 |
| 6,651,086 B1 | * | 11/2003 | Manber et al. | 709/205 |

OTHER PUBLICATIONS

"Microsoft Press Computer Dictionary Third Edition", Microsoft Press, pp. 273-274.*

* cited by examiner

*Primary Examiner*—Le Hien Luu
(74) *Attorney, Agent, or Firm*—Trop, Pruner & Hu, P.C.

(57) ABSTRACT

A programming guide for streaming video files may be automatically compiled in response to a user request. The user may provide keywords for categories of streaming video files that are of interest. A graphical user interface is automatically developed which splits responsive streaming video files into categories requested by the user. Each streaming video file may be represented in a user selected fashion. For example, the streaming videos may be represented by a representative frame, title or other information. The user can then click on any of the streaming video files, broken down into the appropriate categories, to begin viewing a streaming video file of interest.

29 Claims, 4 Drawing Sheets

STREAMING VIDEO PROGRAMMING GUIDE

Language [English]   Location [None] — 14
                                    — 12

| | | | |
|---|---|---|---|
| Current News | Air force TV News<br>240x180/<br>3mins 26sec<br>RAM<br>fastv.com<br>T1 — 20 | BC TV News<br>160x112/1hr 00min<br>RAM<br>tv4bc.com<br>28.8 — 29 | CNN<br>All sport news Sunday<br>240x180/11min14sec<br>RAM<br>fastv.com/p.975 |
| Sports — 16 | CNN — 20<br>While We Are On — 23<br>240x180/28sec — 24<br>RAM — 26<br>fastv.com — 28 | 10Top Website<br>240/176/31sec<br>RAM<br>oswego.edu<br>T1 | Mississippi vs.<br>Vanderbilt<br>Sports Sec Basketball<br>240x180/14sec<br>RAM<br>Fastv.com |
| Celine Dion | CNN<br>She Comes Back<br>240x180/28sec<br>RAM<br>fastv.com | E!Online<br>Beauty & The Beast<br>160x112/48sec<br>RAM<br>eonline.com | CNN<br>Celine Dion...<br>240x180/25sec<br>RAM<br>Fastv.com |

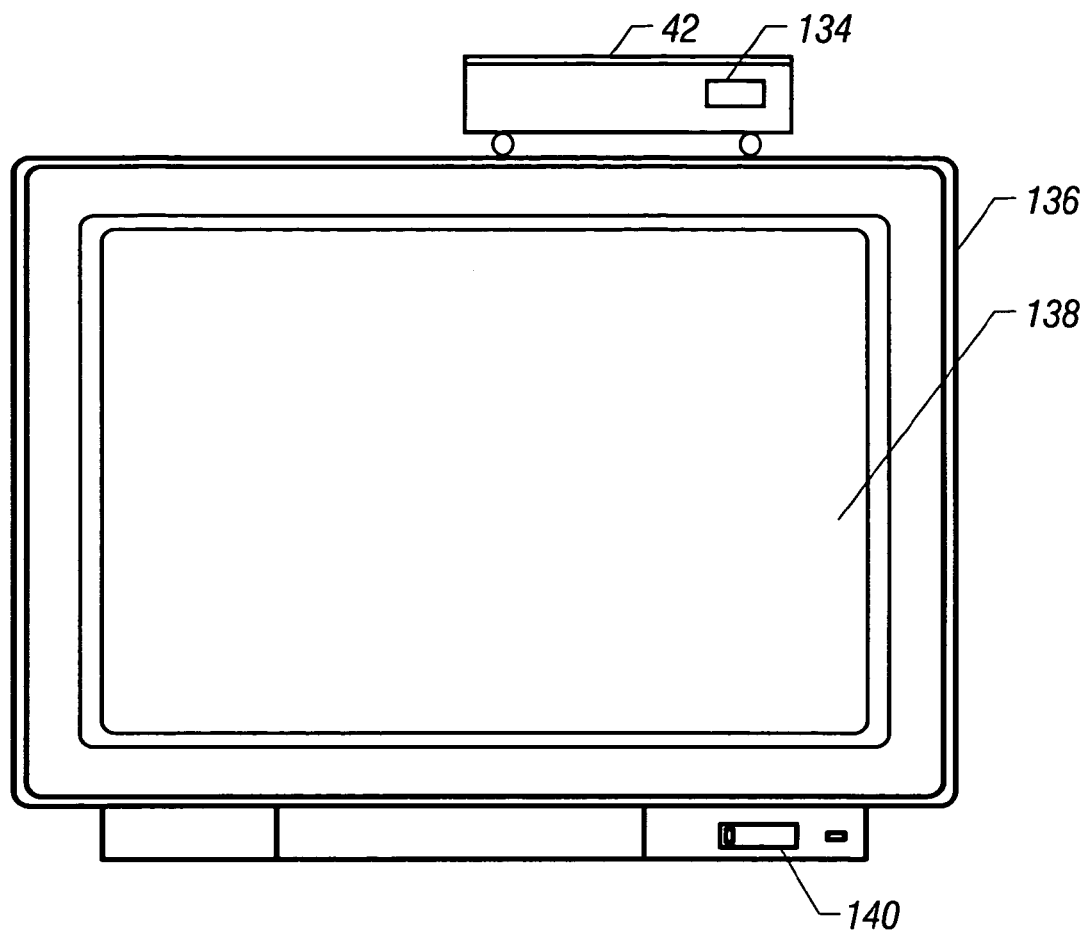
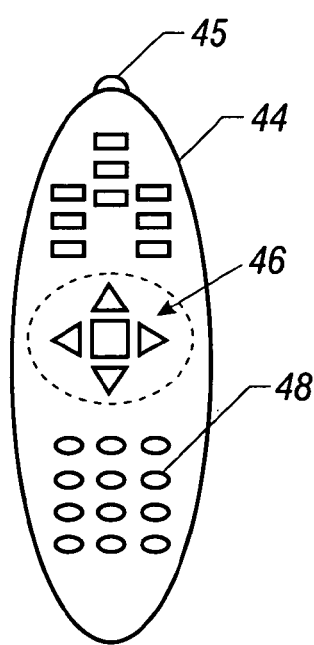
FIG. 4

STREAMING VIDEO PROGRAMMING GUIDE SYSTEM SELECTING VIDEO FILES FROM MULTIPLE WEB SITES AND AUTOMATICALLY GENERATING SELECTABLE THUMBNAIL FRAMES AND SELECTABLE KEYWORD ICONS

BACKGROUND

This invention relates generally to streaming video available for download over the Internet.

A variety of streaming video formats are available for Internet download. Streaming video is video that may begin playback before being completely downloaded. Streaming video reduces the amount of time the user must wait before beginning to enjoy the media. Common streaming video formats include Real Networks, real video format, file extension .ram and Microsoft's Media Player format, file extension .ast. Generally the streaming media is played through a browser plug-in which may also be downloaded.

Because of the ease in preparing streaming videos and making them available over the Internet, an increasing number of streaming videos are available from a wide variety of sources. As a result there are a large number of streaming videos and a correspondingly large number of video sources, many of whom may be unrecognized. This proliferation makes it difficult for users to identify available streaming videos that are of interest. For example, while one may enjoy streaming videos on a particular topic, there is no way for the user to know when a particular streaming video on that topic is available.

Thus, there is a need for better ways to facilitate the viewing of streaming video.

BRIEF DESCRIPTION OF THE DRAWINGS

FIG. 1 is a depiction of a graphical user interface in accordance with one embodiment of the present invention;

FIG. 4 is a front elevational view of a hardware implementation of one embodiment of the present invention.

DETAILED DESCRIPTION

Figure 2:
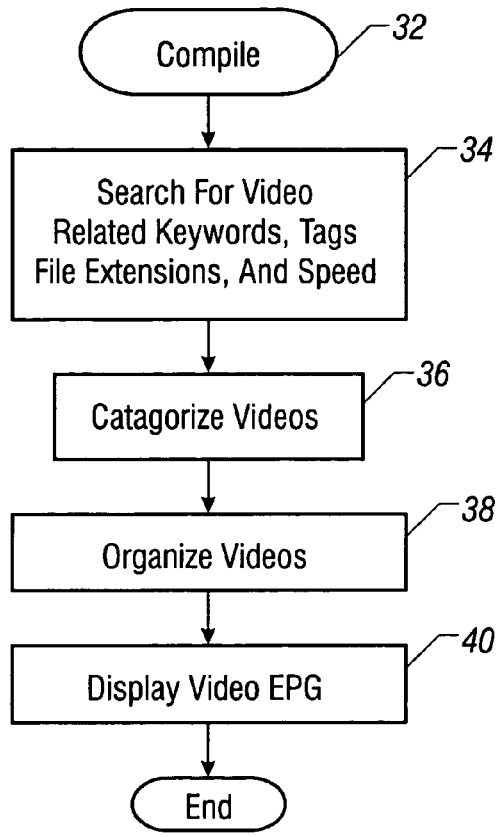
FIG. 2 is a flow chart for software in accordance with one embodiment of the present invention.

Referring to FIG. 1, a streaming video programming guide may be implemented as a graphical user interface 22 displayed on a monitor or television screen associated with a processor-based system. The streaming video programming guide may arrange, for selection and viewing, a plurality of representation of streaming video files. These streaming video files are collected automatically by a search engine that automatically and periodically searches the Internet. The user may provide a plurality of categories of topical interest to the user. The search engine then searches the Internet for streaming video file of interest to a user, for example by using keyword searching.

When appropriate streaming video files that satisfy the criteria set by the user are located, those video files may be identified in the graphical user interface 22 using video thumbnail frames 18, titles 23, and other information 20, 24, 26, 28 and 29 culled from the web site offering the streaming video file for downloading. All of this information may be displayed in a chart format as shown in FIG. 1 for selection by the user.

More specifically, the user may select video files for viewing in a variety of different categories. The user may also input keywords that are utilized by a search engine to assemble the graphical user interface 22. For example, in the illustration in FIG. 1, the user has provided the keywords "current news", "sports", and "Celine Dion" as topics of interest for viewing streaming videos. In the organization shown in FIG. 1, each of the topics or category icons 16 identify a series of three streaming video files that are responsive to the user-provided keywords. Thus, each responsive streaming video file may be represented by a thumbnail frame 18, a title 23 or other descriptive material 20, as well as the type of the file extension 26, the web site sponsoring the streaming video as indicated at 28, and the available connection speed 29. In addition, quantitative information 24 about the streaming video may be provided. In the case of the streaming video represented by the thumbnail frame 18, the video file is in a 240×180 pixel format and lasts for twenty-eight seconds.

Sufficient information is provided about each of the identified streaming video files to allow the user to determine whether or not the user wishes to view the material. Based on the thumbnail frame 18, the title 23, the length and the file extension 26, the user may decide whether or not to view the material. In one embodiment of the present invention, the user can simply click on any of the identified items including the thumbnail frame 18 and the title 23 to automatically play the video file in place of the graphical user interface 22. In addition, in some embodiments of the present invention, a video file may be played initially within the thumbnail frame 18.

If the user finds that none of the depicted set of video files in a given category is of interest, the user can click on the category icon 16 to display the next series of video files in place of the currently displayed video files. Moreover, in some embodiments of the present invention, if the user clicks on the category icon 16, the entire interface 22 may be converted to a display of video files pertinent to that category. Thus, if the user mouse clicks on the sports icon 16, the current news and Celine Dion video files may be removed from the graphical user interface 22 and replaced with additional video files in the sports category.

Generally, the streaming video files are provided by web sites that also provide descriptions of those video files. The descriptions may include textual material about the particular streaming video files. In addition, descriptive metatags may be provided. Finally, the search engine may search for the particular file extensions associated with streaming video files such as .ram and .ast.

The user can also limit the search done by the search engine to video files in a particular language as indicated by the icon 12. The user can input the desired language using a selection box associated with the icon 12. In addition, the user can limit the search for video files to a given location. In such case, the search engine may search for information in textual form associated with the streaming video files that provide information sufficient to determine the location involved. For example, the textual material accompanying the video may identify key words representative of a given location, such as zip codes, state names or other geographical information.

The search engine may search for a combination of file extensions and key words that correspond to streaming video files having the content requested by the user. The information may then be parsed into the categories as requested by the user, such as the current news, sports and Celine Dion category icons 16 in the illustrative graphical user interface 22.

In a compile mode, the search engine may search for video files, as described above, using the software 32 in one embodiment of the invention shown in FIG. 2. The compile mode may occur at regular intervals so that the search engine periodically searches for the videos in the desired categories. Alternatively, the search may be conducted at the time when the user selects the streaming video programming guide.

The search engine searches for video files and related keywords, metatags, connection speeds and file extensions as indicated in block 34. Any responsive video files are then categorized based on key words as indicated in block 36. The video files are then organized according to categories as indicated in block 38. Finally, the graphical user interface 22 is displayed with representations of each of the video files that were located, organized in a grid format as depicted for example in FIG. 1 and as indicated in block 40 in FIG. 2.

The user may select the video for viewing by mouse clicking on its title 20 or thumbnail frame 18. In addition, the user can link to the web site offering the video by clicking on the web site uniform resource locator 28.

Figure 3:
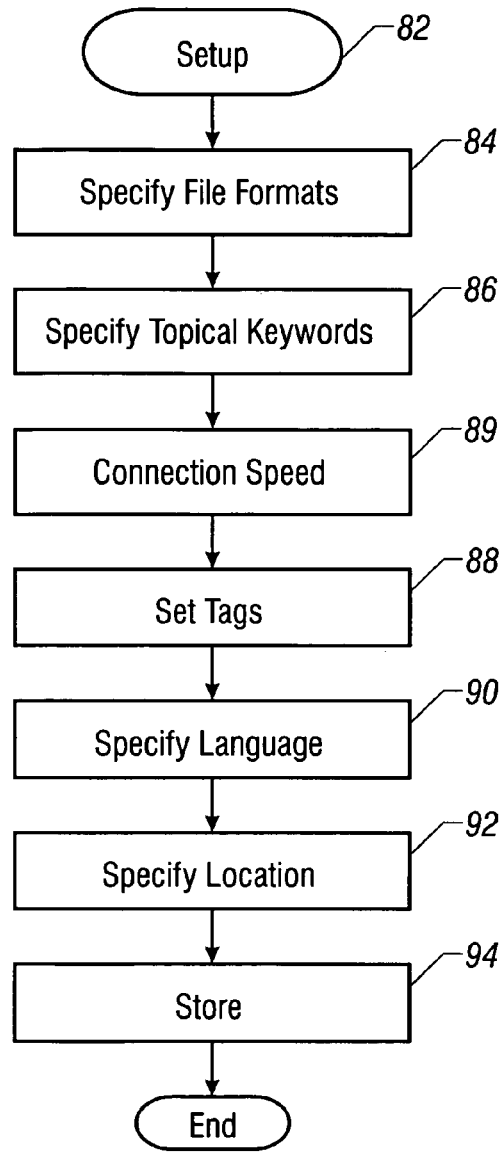
FIG. 3 is a flow chart for software in accordance with another embodiment of the present invention.

In a set-up mode implemented by software 82 in one embodiment, the user can specify the search criteria for the compiled software 32 as indicated in FIG. 3. The user may specify the file formats as indicated in block 84. For example, the software 82 may provide a graphical user interface that asks the user to input a streaming video file format such as .ram or .ast or to search for all file formats.

Next, the user is asked to specify topical keywords as indicated in block 86. The topical keywords then become the category icons 16 in the resulting graphical user interface 22. In one embodiment of the present invention, the user may provide an overall keyword that becomes the category icon 16 and may also provide additional keywords to further refine the search to obtain the material that the user in fact is actually interested in.

The user may also specify a minimum connection speed as indicated in block 89. Some users may prefer not to view files from sites with slow connection speeds. Also, the user may input the user's connection speed so that the file with the corresponding connection speed may be automatically selected if available.

Next, the user is called upon to set tags as indicated in block 88. The tags may be information about particular items of interest to the user. For example, the user may only be interested in getting information on particular web sites, information of a specific duration, or information provided by specific types of sources that may be provided for example by metatags.

Next, the user is called upon to specify the language of the streaming video as indicated in block 90. Finally, the user may be asked to specify a location that may be utilized in narrowing the search still further. The user may provide states, cities, countries or zip codes which may be searched for by the engine to locate geographically relevant material as indicated in block 92.

Once all the appropriate entries in the graphical user interface have been filled out, the information is automatically stored (block 94) for automatic development of the graphical user interface 22 and to automatically implement the desired search. That is, the search terms are plugged in as the category icon 16 titles.

The graphical user interface 22 shown in FIG. 1 may be used with a variety of processor-based systems including, but not limited to, desktop computers, laptop computers, appliances such as telephones and Internet appliances, and the like. In one embodiment of the present invention, shown in FIG. 4, the set-top box 42 may be coupled to a television receiver 136. The set-top box 42 conveniently sits atop the television receiver 136—ergo, the name set-top box. The television receiver 136 may include a display screen 138 that displays the graphical user interface 22.

Both the set-top box 42 and the television receiver 136 include infrared interfaces 134 and 140 respectively. A remote control unit 44 may include its own infrared interface 45 for interacting and controlling the television receiver 136 and the set-top box 42. Thus, inputs provided through the remote control unit 44 may be provided over a wireless interface, such as a radio frequency interface, to the interfaces 134 and 140. The wireless signals appropriately control the set-top box 42 and the television receiver 136. The user can implement mouse-like cursor commands through the cursor controls 46 which include a plurality of directional buttons and a select button. In addition, channel entries may be entered through channel keys 48.

Figure 5:
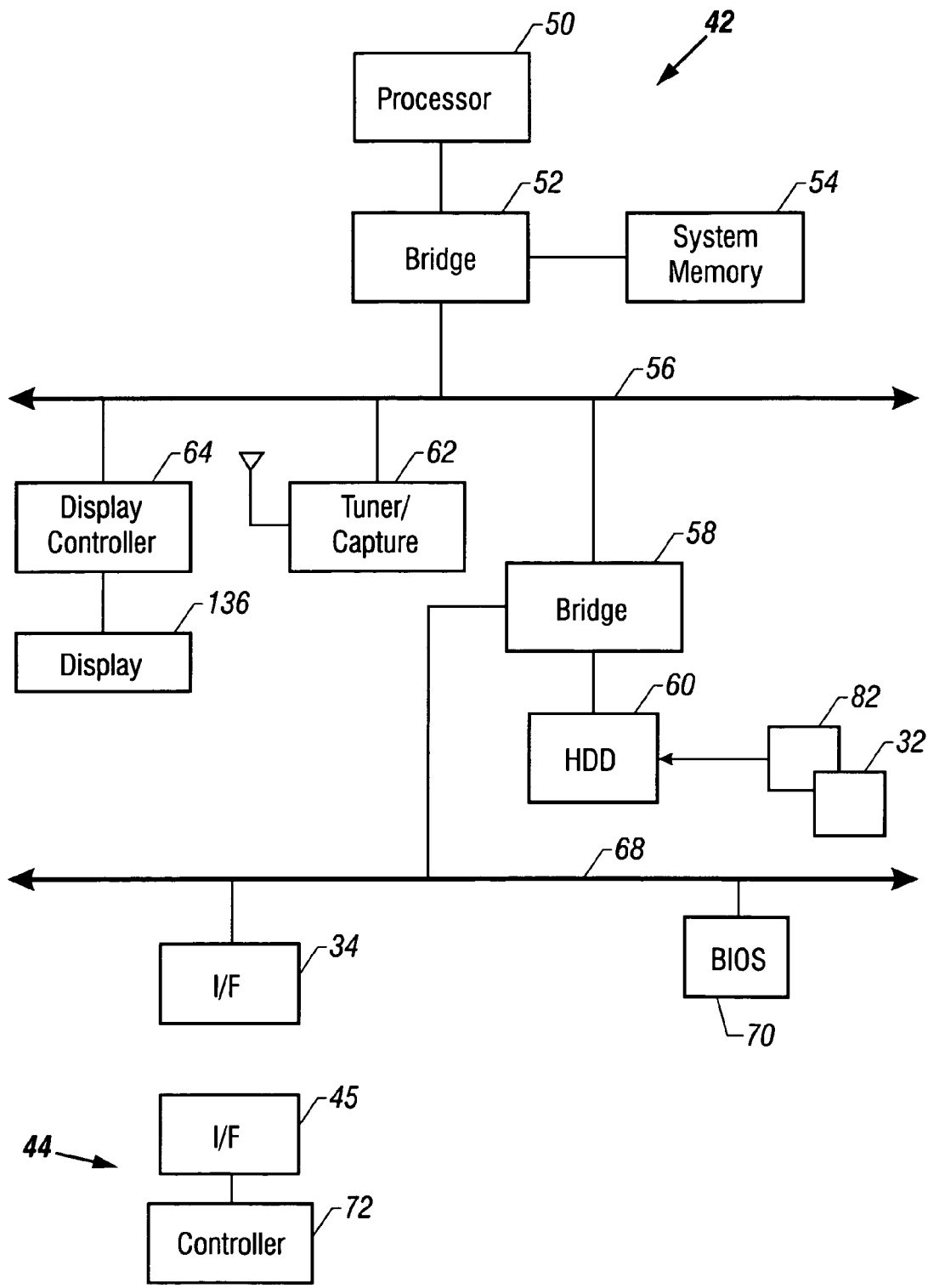
FIG. 5 is a block diagram for hardware in accordance with one embodiment of the present invention.

Referring next to FIG. 5, the set-top box 42 may include a processor 50 coupled to a bridge 52. The bridge 52 couples a bus 56 and the system memory 54. Also coupled to the bus 56 are a display controller 64, a television tuner/capture card 62 and an additional bridge 58. The display controller 64 may be coupled to the television receiver 136. The television tuner/capture card 62 may be coupled to an appropriate source of video such as a broadcast antenna, a satellite receiver or a cable connection.

The bridge 58 may be coupled to a hard disk drive (HDD) 60 that stores the software 82 and 32. In addition, the hard disk drive 60 may include a database that stores information about the selected categories for search, search terms, and the information located in an appropriate search.

In one embodiment of the present invention, the search may be actually implemented by the software 82 and 32 stored on the hard disk drive 60. In other embodiments, the search is actually implemented by a web server that is automatically called up over the Internet when the search is requested.

The bridge 58 couples a bus 68. The bus 68 is coupled to a basic input/output system (BIOS) 70 and the interface 134. The interface 134 implements a wireless interface with an interface 45 associated with the remote control unit 44. The remote control unit 44 includes the interface 45 and a controller 72 that receives keypad inputs and translates them into appropriate signals for transmission to the interface 134.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   automatically searching, on a plurality of web sites, for streaming video files;
   selecting particular streaming video files from said plurality of web sites based on a text search using keywords;
   in response to said search, automatically generating a graphical user interface including selectable thumbnail frames to represent said selected streaming video files and selectable icons of said keywords, said selectable thumbnail frames organized by said keywords; and in response to user selection of one of said selectable thumbnail frames, playing the video file corresponding to the selected thumbnail frame in said thumbnail frame.

2. The method of claim 1 where automatically searching for streaming video files includes automatically searching for predetermined file extensions associated with streaming video files.

3. The method of claim 1 wherein automatically searching for streaming video files includes automatically searching for streaming video file extensions and for keywords in web sites associated with said streaming video files.

4. The method of claim 1 including displaying said selectable icons of said keywords in a column and said thumbnail frames in rows.

5. The method of claim 4 including associating a uniform resource locator for the home page of a web site sponsoring a selected streaming video file with a corresponding thumbnail frame.

6. The method of claim 5 including automatically playing, in said thumbnail frame, said video file in response to a user selection of said uniform resource locator.

7. The method of claim 4 wherein said keywords are provided by a user to be used as user-selectable category icons and displaying a first set of thumbnail frames in association with each category icon.

8. The method of claim 7 including accessing said video file over the Internet in response to a user selection of said video file.

9. The method of claim 7 including in response to selecting a given keyword category icon, replacing the display of said first set of representations of said video files with a second set of representations of said video files, said second set of representations of said video files other than the first set.

10. The method of claim 1 wherein automatically searching for streaming video files includes periodically automatically searching for streaming video files.

11. The method of claim 1 wherein automatically searching a plurality of web sites includes automatically transmitting a request to a remote web server for a search engine to perform said web site search.

12. The method of claim 1 wherein generating a graphical user interface includes providing a field to enable a user to designate a geographical location and automatically searching in text associated with streaming video files to limit the search by the designated location.

13. The method of claim 1 wherein generating a graphical user interface includes providing a space to enable a user to designate a language and limiting said search by the designated language.

14. A computer accessible medium storing instructions to:
automatically search, on a plurality of web sites, for streaming video files;
select particular streaming video files from said plurality of web sites based on a text search using user-provided keywords;
generate selectable representations of said selected streaming video files and said user-provided keywords to organize a first grouping of video file representations by keyword and to display said selectable representations in a graphical user interface in the form of a streaming video content guide; and
in response to user selection of one of the selectable keyword representations and for the selected category, display a second grouping of video file representations other than the first grouping of video file representations in said graphical user interface in place of said first grouping of video file representations.

15. The medium of claim 14 further storing instructions to automatically search for predetermined file extensions associated with streaming video files.

16. The medium of claim 14 further storing instructions to automatically search for streaming video file extensions and for keywords in web sites associated with said streaming video files.

17. The medium of claim 14 further storing instructions to represent each video file by a thumbnail frame.

18. The medium of claim 17 further storing instructions to automatically play said video file in response to a user selection of said thumbnail video.

19. The medium of claim 14 further storing instructions to use said keywords as category icons and display a plurality of video files associated with each category icon.

20. The medium of claim 19 further storing instructions to access said video file over the Internet in response to a user selection of said video file.

21. The medium of claim 14 further storing instructions to automatically transmit a request to a web server to search more than one web site on the Internet for streaming video files.

22. A system comprising:
a processor; and
a storage coupled to said processor, said storage storing instructions that enable the processor to automatically search a plurality of web sites for streaming video files, select particular video files from said web sites based on a text search for keywords, generate a graphical user interface including thumbnail representations corresponding to selected streaming video files, uniform resource locators associated with corresponding thumbnail representations, the uniform resource locators for the home pages of the web sites hosting the selected streaming video files, and said keywords, said thumbnail representations and associated uniform resource locators organized according to corresponding keywords, and in response to user selection of either a given thumbnail representation or the associated uniform resource locator, play the corresponding video file.

23. The system of claim 22 including a set-top box.

24. The system of claim 23 including a television receiver.

25. The system of claim 23 including a remote control unit.

26. The system of claim 22 wherein said storage stores additional instructions that enable the processor-based system to automatically transmit a request to a remote web server to search the various web sites for streaming video files.

27. A method comprising:
receiving a first user-provided keyword to indicate a general category of interest and a second user-provided keyword to indicate a sub-category of interest;
automatically searching for streaming video files on a plurality of web sites to select particular streaming video files based on a text search using said first and second keywords; and
generating a graphical user interface in the form of a streaming video programming guide, said guide including a selectable keyword icon corresponding to one of the user-provided keywords and selectable representations of said selected streaming video files, the representations of the selected streaming video files associated with a corresponding keyword icon.

28. The method of claim 27 including selecting a representation of a streaming video file to play the video file, in full screen, in place of a display of said programming guide.

29. The method of claim 27 including selecting a keyword icon, and in response thereto, displaying a graphical user interface including additional representations of selected streaming video files corresponding to the selected keyword category.

\* \* \* \* \*